United States Patent
Tsutsui et al.

(10) Patent No.: US 7,314,584 B2
(45) Date of Patent: Jan. 1, 2008

(54) POLYMER GEL COMPOSITION AND OPTICAL DEVICE USING THE SAME

(75) Inventors: Hiroaki Tsutsui, Minamiashigara (JP); Masahiro Moriyama, Minamiashigara (JP); Ryojiro Akashi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 316 days.

(21) Appl. No.: 10/805,341

(22) Filed: Mar. 22, 2004

(65) Prior Publication Data
US 2004/0188661 A1 Sep. 30, 2004

(30) Foreign Application Priority Data
Mar. 24, 2003 (JP) ............... 2003-080388

(51) Int. Cl.
*B01F 3/12* (2006.01)
*C09K 9/00* (2006.01)
*G02B 1/06* (2006.01)
*G02B 26/02* (2006.01)
*G02F 1/00* (2006.01)

(52) U.S. Cl. ............ 252/583; 359/228; 359/665; 516/31

(58) Field of Classification Search ........... 252/583
See application file for complete search history.

(56) References Cited

U.S. PATENT DOCUMENTS

| | | | | |
|---|---|---|---|---|
| 4,891,119 A | * | 1/1990 | Ogawa | 204/469 |
| 6,287,485 B1 | * | 9/2001 | Akashi et al. | 252/583 |
| 6,295,167 B1 | * | 9/2001 | Uematsu et al. | 359/665 |
| 6,785,035 B2 | * | 8/2004 | Uematsu et al. | 359/265 |
| 2003/0012934 A1 | * | 1/2003 | Kawahara et al. | 428/209 |
| 2004/0121017 A1 | * | 6/2004 | Ishii et al. | 424/487 |

FOREIGN PATENT DOCUMENTS

JP   A 3-79068   4/1991

OTHER PUBLICATIONS

George W. Scherer, "Gel", in AccessScience@McGraw-Hill, http://www.accessscience.com, DOI 10.1036/1097-8542.283800, last modified: Jul. 1, 2002.*

Katono et al., "Thermo-responsive swelling and drug release switching of interpenetrating polymer networks composed of poly (acrylamide-co-butyl methacrylate) and poly (acrylic acid)," Journal of Controlled Release, 16, pp. 215-227, 1991.

Ilmain et al., "Volume transition in a gel driven by hydrogen bonding," Letters to Nature, vol. 349, pp. 400-401, Jan. 1991.

* cited by examiner

*Primary Examiner*—Randy Gulakowski
*Assistant Examiner*—Timothy J. Kugel
(74) *Attorney, Agent, or Firm*—Oliff & Beridge PLC (57) ABSTRACT

The present invention provides a polymer gel composition including: at least two polymer compounds which interact with each other to form a polymer complex; and a liquid. One of the polymer compounds forms a three-dimensional crosslinked structure, at least one other polymer compound is compatible with the liquid, and at least a portion of the compatible polymer compound is included in the three-dimensional crosslinked structure. Preferably, when the polymer complex is disassembled or decomposed by stimuli, the polymer compound forming the three-dimensional crosslinked structure changes its volume by absorbing or releasing the liquid. The three-dimensional crosslinked structure is preferably in a particle shape. An optical device using such a polymer gel composition is also provided.

9 Claims, 1 Drawing Sheet

POLYMER GEL COMPOSITION AND OPTICAL DEVICE USING THE SAME

CROSS-REFERENCE TO RELATED APPLICATIONS

This application claims benefit of and priority to Japanese Patent Application 2003-80388, filed on Mar. 24, 2003, which is incorporated herein by reference in its entirety for all purposes.

BACKGROUND OF THE INVENTION

1. Field of the Invention

The present invention relates to a novel polymer gel composition capable of changing its volume by absorbing or releasing a liquid in response to an external stimulus and further relates to an optical device using such a polymer gel composition.

2. Description of the Related Art

In recent years, reports have been given regarding stimuli-responsive gels, which exhibit an expanding or shrinking phenomenon in response to various types of external stimuli. For example, such gels have a potential to be applied to a variety of fields such as a drug delivery systems, chemical actuators (such as artificial muscles and micro valves) and material separation. An optical device technology is also known in which stimuli-responsive polymer gels can be used to perform light modulation or fading, coloring by controlling transmittance or scattering of light.

Some stimuli-responsive gels are known to utilize an interaction of hydrogen bonds and ionic bonds and the like between polymer chains. Such gels use, for example, materials that form a polymer complex in a solution by hydrogen bond formation, such as a combination of poly(acrylic acid) and polyacrylamide. At low temperatures, poly(acrylic acid) and polyacrylamide can form a water-insoluble polymer complex with hydrogen bonds in water, but at high temperatures, the hydrogen bond is cleaved and the polymer complex can be dissolved in water. It is known that, if such polymers capable of forming a polymer complex are crosslinked so as not to dissolve in water, then such crosslinked materials can form a gel capable of changing its volume in response to temperatures, wherein the polymer chains in water can aggregate and shrink at low temperature and at high temperatures the hydrogen bond can be cleaved and the polymer chains expanded.

Such a gel utilizing the interaction between the polymer chains is known to change its volume in response to temperatures, pH, or solvent compositions. In particular, that the temperature-responsive interaction between polymers can produce low temperature-shrinking and high temperature-expanding characteristics, and some applications of such a material to a drug delivery system, has been proposed. For example, a hydrogen bond-utilizing system has been reported, which uses an interpenetrating network (IPN) structure of polyacrylamide and poly(acrylic acid), and investigations are being made regarding its application to control of drug containment/release properties (for example, see Japanese Patent Application Laid-Open (JP-A) No. 3-79068 and "*J. Control Release*" No. 16, pages 215-227 (1992).

However, the process of forming the IPN gel having a complex of two polymer gel components requires mixing a previously synthesized first component-containing polymer gel with a second component and allowing the components to penetrate before polymerization. Additionally, in order to process the gel particles into a particle shape, a certain technique, such as a method of performing the reaction in a very small vessel, is required to prevent the polymerization of the second component from producing the coupling between the first component particles. For example, a known method includes forming the first component-containing polymer gel in a capillary (for example, see Ilmain et al., *Nature*, 349, page 400, 1991). Another known method includes processing the first component-containing polymer gel into the desired form, then allowing the second component-containing solution to penetrate, and independently polymerizing the second component-containing polymer gel so that the first component-containing polymer gel particles do not aggregate by the second component (for example, see "*J. Control Release*" No. 16, pages 215-227 (1991). Another method includes allowing a monomer for forming the second component to penetrate into a large bulk gel that contains the first component, then performing polymerization and pulverizing the product. However, such a method is not industrially practical, since an extremely long time is necessary for the second component-forming monomer and crosslinker to penetrate into the first component-containing bulky gel.

As mentioned above, the conventional process of producing the IPN structure is generally complicated and can involve a very high cost particularly in cases in which particles or the like need to be processed. Thus, the conventional process is not suitable for mass production.

SUMMARY OF THE INVENTION

The invention has been made to solve the above problem. Thus, the invention provides a polymer gel composition that can be easily produced without the conventional IPN-forming process and that is responsive to a stimulus by using the interaction between at least two polymer compounds. The invention also provides an optical device using such a gel composition.

The present inventors have made active investigations and finally found that a response to a stimulus at the same level as or a higher level than that of the conventional IPN structure can be produced by a composition that comprises at least two polymer compounds forming a polymer complex by interaction with each other, wherein at least one of the polymer compounds forms a three-dimensional crosslinked structure; at least one other polymer compound is compatible with the liquid; and at least a portion of the compatible polymer compound is included in the three-dimensional crosslinked structure. Thus, the invention is directed to a polymer gel composition, comprising: at least two polymer compounds which interact with each other to form a polymer complex; and a liquid, wherein one of the polymer compounds forms a three-dimensional crosslinked structure; at least one other polymer compound is compatible with the liquid; and at least a portion of the compatible polymer compound is included in the three-dimensional crosslinked structure.

Further, the invention provides an optical device that uses the polymer gel composition described above.

DETAILED DESCRIPTION OF THE INVENTION

The polymer gel composition of the present invention and the optical device using the same are described in detail below, but such a description of a basic composition as provided below is not intended to limit the scope of the invention.

Polymer Gel Composition

The polymer gel composition of the invention comprises: at least two polymer compounds which interact with each other to form a polymer complex; and a liquid, wherein one of the polymer compounds forms a three-dimensional crosslinked structure (hereinafter, such a structure formed of the polymer compound may simply be referred to as "the three-dimensional crosslinked structure"); at least one other polymer compound is compatible with the liquid; and at least a portion of the compatible polymer compound is included in the three-dimensional crosslinked structure.

The strength of the interaction between the polymer compounds forming the polymer complex is affected by an externally applied stimulus such as a change in temperature, pH, ionic concentration, or the like. Consequently, the three-dimensional crosslinked structure constituting the polymer complex changes its volume, its light transmission properties or the like. In a preferable mode of the invention, the polymer complex is reversibly disassembled by a stimulus so that the polymer compound forming the three-dimensional crosslinked structure can exhibits a change in volume by absorbing or releasing the liquid. The interaction between the polymer compounds may be any type that can produce the polymer complex and is preferably hydrogen bond, ionic bond or the like.

In the invention, the point at which a change in volume is produced is also referred to as "a phase transition point", which corresponds to a threshold value of the external stimulus at the time when the polymer compound forming the three-dimensional crosslinked structure produces a change in volume from an expanded state to a shrunken state and vice versa by external stimuli such as change of heat, pH or the like. In a case where the polymer compound forming the three-dimensional crosslinked structure produces a change in volume in response to a change in temperature, for example, the phase transition point corresponds to a phase transition temperature.

Combination of Polymer Compounds for forming the Polymer Complex

The combination of the polymer compounds for forming the polymer complex by hydrogen bond may be any combination of any known polymers having a hydrogen bond-forming group and thereby capable of forming a polymer complex.

For example, the text "*Polymer Complexes: Functions and Applications*, No. 5, *Polymer Aggregates*" published by Japan Scientific Societies Press describes combinations of polymer compounds capable of forming a polymer complex. Particularly preferable are a combination of poly((meth) acrylic acid) and poly(meth)acrylamide, a combination of poly((meth)acrylic acid) and polyethylene glycol, a combination of poly((meth)acrylic acid) and poly(dimethyl(meth) acrylamide), and the like. The combination of poly((meth) acrylic acid) and poly(meth)acrylamide is more preferable in terms of volume changing property. These polymers may be a homopolymer but preferably a copolymer copolymerized with any other monomer, as long as such a monomer does not interfere with the hydrogen bond between the polymers.

The parentheses indicate that the enclosed prefix is optional. For example, therefore, the wording "(meth)acrylic acid" means any of acrylic acid and methacrylic acid.

The combination of the polymer compounds for forming the polymer complex by ionic bond formation may be any combination of any polycationic polymer compound and any polyanionic polymer compound. Examples of such a combination are described in the text "*Polymer Complexes: Functions and Applications*, No. 5, *Polymer Aggregates*" published by Japan Scientific Societies Press.

Specific examples of the polyanion include a polycarboxylate such as poly(meth)acrylate and a polysulfonate such as polystyrene sulfonate and poly-2-(meth)acrylamide-2-methylpropane sulfonate. Examples of the polycation include poly(allylamine hydrochloride) and a polyammonium salt such as polyionene. A polymer having both of cationic and anionic groups in its molecule may also be used. For example, such a polymer is, but not limited to, poly-3-dimethyl (methacryloyloxyethyl) ammonium propane sulfonate. These polymer compounds with the ionic group may be a homopolymer, but preferably a copolymer copolymerized with any other monomer, as long as such a monomer does not interfere with the ionic bond between the polymers.

The combination of the polymer compounds for forming the polymer complex may contain any combination of any substituents capable of contributing to the interaction. In a preferable combination, one of the polymer compounds for forming the polymer complex has at least a carboxylic amide group, and at least one other polymer compounds has a carboxyl group. Such a combination of the polymer compounds containing such substituents can form a hydrogen bond between the carboxylic amide group and the carboxyl group so that the polymer compound forming the three-dimensional crosslinked structure can produce a change in volume.

Polymer Compound Forming Three-Dimensional Crosslinked Structure

In the invention, the polymer compound forming the three-dimensional crosslinked structure can be produced by any known gel preparation method. Examples of such a method include a method of mixing and polymerizing a monomer and a crosslinking agent, a method of allowing a macro-monomer and a crosslinking agent to react with each other, and a method of crosslinking a polymer by application of electron beam, neutron beam or the like. For example, such gel preparation methods are described in detail in "*Gel Handbook*" published by NTS Inc. (Tokyo, Japan).

Examples of the monomer for use in the production of the polymer compound for the three-dimensional crosslinked structure include (meth)acrylamide, dimethyl(meth)acrylamide, methyl(meth)acrylamide, (meth)acrylic acid, and (meth)acrylate esters such as methyl (meth)acrylate, ethyl (meth)acrylate, and butyl (meth)acrylate. Particularly preferable are (meth)acrylamide and dimethyl(meth)acrylamide. Any other known monomer may also be used in combination, within the limits of not harming the effect of the invention.

The wording such as (meth)acrylamide also refers to any of methacrylamide and acrylamide.

Examples of the crosslinking agent for use in the production of the three-dimensional crosslinked structure-forming polymer compound include a di(meth)acrylamide derivative such as methylenebis(meth)acrylamide, a polyfunctional (meth)acrylate ester such as ethylene glycol di(meth)acrylate and glyceryl (meth)acrylate, a divinyl derivative such as divinyl benzene, and a diallyl derivative such as diallyl phthalate. In particular, methylenebis(meth)acrylamide is preferable.

In a preferable mode, the polymer compound forming the three-dimensional crosslinked structure has at least one ionic substituent, for the purpose of increasing the amount of volume change by stimuli. Examples of such an ionic substituent include carboxylic acid, sulfonic acid, an ammonium group, and a phosphoric acid group. Such an ionic substituent may be incorporated into the polymer compound forming the three-dimensional crosslinked structure by any of: a method of copolymerizing a monomer having such an ionic substituent in preparation of the polymer compound forming the three-dimensional crosslinked structure; a method including impregnating the polymer compound forming the three-dimensional crosslinked structure with a monomer having such an ionic substituent and polymerizing the monomer to form an IPN (interpenetrating network) structure; and a method of partially converting the substituent of the polymer compound forming the three-dimensional crosslinked structure into such an ionic substituent by a chemical reaction such as hydrolysis and oxidation.

The polymer compound forming the three-dimensional crosslinked structure may be copolymerized with or coupled to any stabilizing agent such as a UV absorber and a light stabilizer within the limits of not degrading its characteristics. For example, a hindered amine compound, a hindered phenol compound or a compound having a light stabilization function may preferably be copolymerized or coupled.

The content of the copolymerized or coupled stabilizing agent in the polymer compound forming the three-dimensional crosslinked structure is preferably from 0.01 to 5% by mass, more preferably from 0.01 to 2% by mass, particularly preferably from 0.05 to 1% by mass.

The polymer compound forming the three-dimensional crosslinked structure may be in any form. In terms of stimuli-responsive characteristics, the three-dimensional crosslinked structure is preferably in a particle shape. Such a particle may have any shape such as a sphere, an ellipsoid, a polyhedron, a porous structure, a fiber, a star, a needle, and a hollow structure, but not limited to them. Particularly preferable are the sphere, the ellipsoid, and the polyhedron.

In a case where the polymer compound forming the three-dimensional crosslinked structure forms particles, the average particle diameter is preferably from 0.01 µm to 50 mm, more preferably from 0.1 µm to 10 mm, particularly preferably from 1 µm to 5 mm, in a dry state. If the average particle diameter is less than 0.01 µm, the particles can tend to cause aggregation and can be difficult to handle when used. If the average particle diameter is more than 50 mm, the speed of the response to stimuli can sometimes be low.

For example, the particles of the polymer compound forming the three-dimensional crosslinked structure may be produced by any of: a method of forming particles by physically crushing the polymer compound forming the three-dimensional crosslinked polymer gel structure; a method including forming particles by chemical pulverization of an uncrosslinked polymer compound and then crosslinking the polymer compound to form polymer particles having the three-dimensional crosslinked structure; and a general method of forming particles such as an emulsion polymerization method, a suspension polymerization method, and a dispersion polymerization method. Alternatively, the particles may be produced by a method including forming fibers by extruding an uncrosslinked polymer compound through a nozzle head or the like, crosslinking the fibers and crushing the crosslinked fibers or a method including crushing the fibers into particles and then crosslinking the particles. Any of these methods may appropriately be selected depending on the purpose or the use.

Polymer Compound Compatible with Liquid

In the polymer gel composition of the invention, at least two polymers capable of interacting with each other are used, wherein at least one of the polymers is compatible with a liquid (hereinafter, such a polymer may be simply referred to as the liquid-compatible polymer), and at least a portion of the liquid-compatible polymer compound is included in the three-dimensional crosslinked structure. Examples of the liquid-compatible polymer compound include both of a polymer compound entirely soluble in the liquid and a polymer compound partially having a crosslinked structure and thus partially soluble in the liquid.

For example, the liquid-compatible polymer compound may be incorporated into the three-dimensional crosslinked structure by a method of allowing the liquid-compatible polymer compound to penetrate into the three-dimensional crosslinked structure by immersing the three-dimensional crosslinked structure in a solution of the liquid-compatible polymer compound. Examples of the polymer compound applicable in such a method include a copolymer including poly((meth)acrylic acid) and (meth)acrylic acid, a copolymer including poly(meth)acrylamide and (meth)acrylamide, and a copolymer including polyethylene glycol, poly(vinyl alcohol) and vinyl alcohol. In particular, poly(acrylic acid) is preferable.

Alternatively, the liquid-compatible polymer compound may be incorporated into the three-dimensional crosslinked structure by a method of producing the liquid-compatible polymer compound in the three-dimensional crosslinked structure by mixing a precursor of the liquid-compatible polymer compound (such as a monomer) with the three-dimensional crosslinked structure. Examples of such a precursor of the liquid-compatible polymer compound (a monomer or the like) include (meth)acrylic acid, an alkyl ester of (meth)acrylic acid such as methyl (meth)acrylate, (meth)acrylamide, and alkyl-substituted (meth)acrylamide such as dimethyl(meth)acrylamide. In particular, (meth)acrylic acid is preferable. Any other known monomer may also be used in combination within the limits of not harming the effect of the invention.

The liquid-compatible polymer compound preferably has a weight average molecular weight of 600 to 5,000,000, more preferably of 2,000 to 500,000. If the molecular weight is less than 600, the stimulus-responsive polymer gel as described below can exhibit a poor response. If the molecular weight is higher than 5,000,000, the polymer compound can have a low solubility so that it can be difficult to form a homogeneous solution; the composition can have a high viscosity so that the processability can be reduced; or the speed of penetration can be low so that the productivity can be reduced, in a case where the method of allowing the compound to penetrate into the three-dimensional crosslinked structure is used.

The liquid-compatible polymer compound should be dissolved in a liquid capable of being absorbed by the three-dimensional crosslinked structure. In such a solution, the concentration of the polymer compound is preferably from 0.2 to 30% by mass, more preferably from 0.2 to 10% by mass. If the concentration is 0.2% by mass or less, it can be difficult to produce a sufficient amount of the polymer complex from the polymer forming the three-dimensional crosslinked structure. If the concentration is higher than 30% by mass, the polymer forming the three-dimensional crosslinked structure can insufficiently absorb the liquid so that the stimulus sometimes cannot produce a sufficient change in volume.

The polymer gel composition of the invention may contain an additional polymer having a crosslinked structure. Such an additional polymer may be produced from a portion of the liquid-compatible polymer compound. The crosslinked structure can be formed in a portion of the liquid-compatible polymer compound by a process including: immersing the three-dimensional crosslinked structure in a solution of a polymer compound having a crosslinkable functional group and being compatible with the liquid so as to allow the polymer compound to penetrate into the three-dimensional crosslinked structure; and subjecting the functional group to a crosslinking reaction. For example, the polymer compound having the crosslinkable functional group and being compatible with the liquid can readily be produced by the reaction of a polymer compound having a functional group such as carboxyl, amino and hydroxyl (such as poly((meth)acrylic acid), a copolymer of (meth) acrylic acid and allylamine or the like, a copolymer of (meth)acrylamide and allylamine, and poly(vinyl alcohol)) with a compound (such as glycidyl methacrylate) having a crosslinkable functional group and a functional group capable of reacting and forming a bond with the functional group of the polymer compound.

In a case where a portion of the liquid-compatible polymer compound has the crosslinkable functional group, it is preferable that the polymer having the crosslinkable functional group and being compatible with the liquid has a relatively high molecular weight and that the polymer having no crosslinkable functional group and being compatible with the liquid has a relatively low molecular weight. In such a case, it can be difficult for the polymer having the crosslinkable functional group and being compatible with the liquid to penetrate into the three-dimensional crosslinked structure, so that the polymer can selectively be placed outside the three-dimensional crosslinked structure and that the crosslinked structure can selectively be constructed outside the three-dimensional crosslinked structure. In such a case, the polymer having the crosslinkable functional group preferably has a weight average molecular weight in a range from 100,000 to 3,000,000, more preferably from 250,000 to 1,500,000.

If a portion of the liquid-compatible polymer compound has the crosslinked structure, the stability of a dispersion of the three-dimensional crosslinked particles can be improved by thickening the inventive polymer gel composition, or the particles can be processed into the desired form. It will also be expected that the mechanical strength of the polymer gel can be improved.

In another mode of the inventive polymer gel composition, a portion of the liquid-compatible polymer compound may have a continuous crosslinked structure, in which a plurality of the polymer compounds forming the three-dimensional crosslinked structure may be contained. In part of the liquid-compatible polymer compound, the continuous crosslinked structure can be formed by the same method as described above as to the formation of the crosslinked structure.

In still another mode of the invention, the polymer gel composition may comprises: at least two polymer compounds which interact with each other to form a polymer complex; a polymer compound including a continuous crosslinked structure, which is other than the at least two the polymer compounds forming the polymer complex; and a liquid, wherein one of the polymer compounds forming the polymer complex forms a three-dimensional crosslinked structure; at least one other polymer compound(s) is compatible with the liquid; at least a portion of the liquid-compatible polymer compound is included in the three-dimensional crosslinked structure; and the continuous crosslinked structure contains a plurality of the three-dimensional crosslinked structures and at least one polymer compound which interacts with the three-dimensional crosslinked structure to form a polymer complex.

For example, the precursor of the polymer compound having the continuous crosslinked structure may be poly (meth)acrylate having an unsaturated double bond group such as a reaction product of poly((meth)acrylic acid) and glycidyl (meth)acrylate and a reaction product of poly ((meth)acrylic acid) and allylamine; poly(vinyl alcohol) having an unsaturated double bond group; or any other known crosslinkable polymer. Particularly preferable are the reaction product of poly((meth)acrylic acid) and glycidyl (meth)acrylate and the poly(vinyl alcohol) having an unsaturated double bond group. The precursor can be crosslinked by heat or light to form the polymer compound having the continuous crosslinked structure. Alternatively, the precursor may be the above polymer compound having the crosslinkable functional group and being compatible with the liquid.

In the case that a portion of the liquid-compatible polymer compound has the crosslinked structure in the inventive polymer gel composition, it is preferable that the crosslink density thereof is lower than that of the three-dimensional crosslinked structure and that the density is in such a degree that the polymer gel composition can be prevented from flowing.

Liquid

In a preferable mode of the inventive polymer gel composition, the polymer compound forming the three-dimensional crosslinked structure is characterized in that it absorbs or releases the liquid to change its volume in response to a stimulus. Examples of the liquid to be absorbed or released by the polymer compound forming the three-dimensional crosslinked structure include water, a liquid freely compatible with water, such as a lower alcohol such as methanol, ethanol, ethylene glycol, propylene glycol, and glycerol, ketones such as acetone and methyl ethyl ketone, ethers such as diethyl ether, THF, 1,4-dioxane, ethylene glycol diethyl ether, esters such as ethyl acetate, dimethylformamide, dimethylacetamide, dimethylsulfoxide, acetonitrile, and urea. Poly(ethylene oxide), or a copolymer including any of the above polymers may also preferably be used. In terms of the volume change properties of the polymer compound forming the three-dimensional crosslinked structure, a monohydric alcohol is particularly preferable, such as methyl alcohol, ethyl alcohol, propyl alcohol, butyl alcohol, and ethylene glycol monoethyl ether.

One of the above liquids may be used alone, or two or more thereof may be used in combination.

In addition to the above components according to the invention, an acidic compound or a basic compound may also be added to the liquid to adjust the acidity. If necessary, any of various types of additives may appropriately be added or mixed, such as a coloring agent, a plasticizer, a surfactant, a stabilizer, a substrate, a UV absorber, an antioxidant, an antimicrobial agent, a preservative, a coupling agent for increasing the adhesion to the substrate, and a viscosity modifier for adjusting the viscosity depending on the method of application.

Stimuli

A preferable mode of the inventive polymer gel composition is characterized in that the polymer complex is reversibly disassembled or decomposed by a stimulus so that the polymer compound forming the three-dimensional crosslinked structure absorbs or releases the liquid to produce a change in volume. Any type of stimulus that can change the strength of the interaction in the polymer complex may be used in the invention. Examples of such a stimulus include heat, a change in pH, a change in solvent composition, and addition of a chemical substance. In particular, heat is preferably used as the stimulus, because in such a case, an optical device can be produced, which can autonomously respond to an environmental change such as a change in temperature. Such an optical device can effectively be of low cost and high performance.

Particularly in the case that the stimulus is heat, the temperature (phase transition temperature) at which the polymer complex changes its volume may be set at any of various temperatures, depending on the structure or composition of the polymer compound for forming the polymer complex.

In the invention, the phase transition temperature is preferably from −5 to 80° C., more preferably from 10 to 60° C. If the phase transition temperature is set at a temperature of −5 to 80° C., an optical device can preferably produced, which can autonomously respond to a change in surrounding temperature (atmospheric temperature or water temperature) in the natural word.

Light-Modulating Materials

The polymer gel composition of the invention can have a wide variety of applications such as actuators (artificial muscles), drug delivery systems, and sensors, and such applications are not restricted. Preferably, the composition is used for an optical device. In the composition for use as an optical material for the optical device, the three-dimensional crosslinked structure as shown above can offer a light-modulating performance by itself, because the volume change can produce a change in light scattering. However, the three-dimensional crosslinked structure should preferably contain a light-modulating material in order to have or produce more significant light-modulating properties or a more significant change in color.

Examples of such a light-modulating material include a dye, a pigment and a light-scattering material. In a preferable mode, the light-modulating material is physically or chemically immobilized on at least one of the inside and the surface of the three-dimensional crosslinked structure.

Preferable examples of the dye include black nigrosine dyes, azo dyes such as red, green, blue, cyan, magenta, and yellow color azo dyes, anthraquinone dyes, indigo dyes, phthalocyanine dyes, carbonium dyes, quinoneimine dyes, methine dyes, quinoline dyes, nitro dyes, benzoquinone dyes, naphthoquinone dyes, naphthalimide dyes, and perinone dyes. Dyes having high optical absorption coefficient are particularly preferable.

Specific examples thereof include C.I. Direct Yellow 1, 8, 11, 12, 24, 26, 27, 28, 33, 39, 44, 50, 58, 85, 86, 87, 88, 89, 98, and 157, C.I. Acid Yellow 1, 3, 7, 11, 17, 19, 23, 25, 29, 38, 44, 79, 127, 144, and 245, C.I. Basic Yellow 1, 2, 11, and 34, C.I. Food Yellow 4, C.I. Reactive Yellow 37, C.I. Solvent Yellow 6, 9, 17, 31, 35, 100, 102, 103, and 105, C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231, C.I. Acid Red 1, 6, 8, 9, 13, 14, 18, 26, 27, 35, 37, 42, 52, 82, 85, 87, 89, 92, 97, 106, 111, 114, 115, 118, 134, 158, 186, 249, 254, and 289, C.I. Basic Red 1, 2, 9, 12, 14, 17, 18, and 37, C.I. Food Red 14, C.I. Reactive Red 23 and 180, C.I. Solvent Red 5, 16, 17, 18, 19, 22, 23, 143, 145, 146, 149, 150, 151, 157, and 158, C.I. Direct Blue 1, 2, 6, 15, 22, 25, 41, 71, 76, 78, 86, 87, 90, 98, 163, 165, 199, and 202, C.I. Acid Blue 1, 7, 9, 22, 23, 25, 29, 40, 41, 43, 45, 78, 80, 82, 92, 93, 127, and 249, C.I. Basic Blue 1, 3, 5, 7, 9, 22, 24, 25, 26, 28, and 29, C.I. Food Blue 2, C.I. Solvent Blue 22, 63, 78, 83 to 86, 191, 194, 195, and 104, C.I. Direct Black 2, 7, 19, 22, 24, 32, 38, 51, 56, 63, 71, 74, 75, 77, 108, 154, 168, and 171, C.I. Acid Black 1, 2, 7, 24, 26, 29, 31, 44, 48, 50, 52, and 94, C.I. Basic Black 2 and 8, C.I. Food Black 1 and 2, C.I. Reactive Black 31, C.I. Food Violet 2, C.I. Solvent Violet 31, 33 and 37, C.I. Solvent Green 24 and 25, and C.I. Solvent Brown 3 and 9.

Each of these dyes or dyes may be used by itself. Alternatively, any combination thereof may be used to produce the desired color.

A dye with a structure having a polymerizable group such as an unsaturated double bond group or a dye capable of reacting with the three-dimensional crosslinked structure, so called, a reactive dye may also preferably be used in terms of immobilizing the dye on the three-dimensional crosslinked structure.

The content of the dye in the three-dimensional crosslinked structure is preferably from 3 to 50% by mass, particularly preferably from 5 to 30% by mass. Under such conditions, the dye content is preferably equal to or higher than the concentration for the saturated absorption in the dried or shrunken three-dimensional crosslinked structure. Herein, the concentration for the saturated absorption refers to a high dye concentration in such a range that the relationship between the dye concentration and the optical density (or the optical absorption quantity) via a specific optical path length significantly deviates from the linear relationship.

Preferable examples of the pigment and the light-scattering material include black pigments such as bronze powder, titanium black, and various types of carbon black (such as channel black and furnace black); white pigments such as metal oxides such as titanium oxide and silica, light-scattering materials such as calcium carbonate and metallic powder; color pigments such as phthalocyanine cyan pigments, benzidine yellow pigments, Rhodamine magenta pigments; and various types of other pigments and light-scattering materials such as an anthraquinone type, an azo type, an azo metal complex, a phthalocyanine type, a quinacridone type, a perylene type, an indigo type, an isoindolinone type, a quinacridone type, and an allylamide type.

Typical examples of the yellow pigment include condensed azo compounds, isoindolinone compounds, anthraquinone compounds, azo metal complexes, methine compounds, and allylamide compounds. Specifically, preferable examples thereof include C.I. Pigment Yellow 12, 13, 14, 15, 17, 62, 74, 83, 93, 94, 95, 109, 110, 111, 128, 129, 147, and 168.

Examples of the magenta pigment include condensed azo compounds, diketopyrrolopyrrole compounds, anthraquinone, quinacridone compounds, lake pigments, naphthol compounds, benzimidazolone compounds, thioindige compounds, and perylene compounds. Specifically, particularly preferable examples include C.I. Pigment Red 2, 3, 5, 6, 7, 23, 48:2, 48:3, 48:4, 57:1, 81:1, 144, 146, 166, 169, 177, 184, 185, 202, 206, 220, 221, and 254.

Applicable examples of the cyan pigment include copper phthalocyanine compounds and derivatives thereof, anthraquinone compounds, and basic dye lake compounds. Specifically, preferable pigments include C.I. Pigment Blue 1, 7, 15, 15:1, 15:2, 15:3, 15:4, 60, 62, and 66.

The pigment or light-scattering material for use preferably has a particle diameter of 0.001 µm to 1 µm, particularly preferably of 0.01 µm to 0.5 µm, in terms of an average particle diameter of primary particles. If the particle diameter is 0.01 µm or less, the pigment or the light-scattering material can tend to flow out of the three-dimensional crosslinked structure. A particle diameter of 0.5 µm or more can cause a deterioration in coloring properties.

It is preferable that the pigment or the light-scattering material should surely be prevented from flowing out of the three-dimensional crosslinked structure. For example, the outflow can be prevented by physically trapping the pigment or the light-scattering material in the network structure of the three-dimensional crosslinked structure with an optimized crosslink density; by using a pigment or a light-scattering material capable of showing strong interaction with the three-dimensional crosslinked structure, electrically, ionically, or in any other physical manner; or by using a pigment or a light-scattering material whose surface is chemically modified.

Examples of the chemical modification of the surface of the pigment or the light-scattering material include: a method of introducing, into the surface, a group capable of forming a chemical bond with the three-dimensional crosslinked structure, such as an unsaturated group such as vinyl and an unpaired electron (radical); and a method of graft coupling of the polymer material.

The content of the light-modulating material is preferably equal to or higher than the concentration for the saturated absorption or for the saturated scattering in the dried or shrunken three-dimensional crosslinked structure. Herein, the concentration for the saturated absorption (or saturated scattering) refers to a concentration in such a range that the relationship between the light-modulating material concentration and the optical absorption quantity via a specific optical path length significantly deviates from the linear relationship. The three-dimensional crosslinked structure which contains the light-modulating material at that concentration or higher can change the optical density or the scattering, when it expands or shrinks.

The concentration of the light-modulating material, equal to or higher than the concentration for the saturated absorption or for the saturated scattering, is generally 3% by mass or more, preferably from 3 to 95% by mass, more preferably from 5 to 80% by mass, particularly preferably from 10 to 50% by mass, in the three-dimensional crosslinked structure. If the concentration is less than 3%, the effect of adding the light-modulating material can be insufficient. If the concentration is higher than 95% by mass, the characteristics of the three-dimensional crosslinked structure can be degraded.

The inventive polymer gel composition can be used as a light modulation material. In such a case, any amount of change in volume may be produced without limitation, but such an amount is preferably as large as possible in terms of change in optical density. For example, the ratio of the volume at the time of expansion to that at the time of contraction is preferably 3 or more, more preferably 5 or more, particularly preferably 15 or more. The change in volume of the stimulus-responsive polymer gel of the invention may be reversible or irreversible. A reversible change is preferable when the polymer gel is used in an optical device such as a light-modulating device, a display device and a sensor, or for a decorative product.

Optical Device

A material for an optical device is a preferable application of the inventive polymer gel composition, which comprises at least two polymer compounds which interact with each other to form a polymer complex; and a liquid, wherein one of the polymer compounds forms a three-dimensional crosslinked structure; at least one other polymer compound(s) is compatible with the liquid; and at least a portion of the liquid-compatible polymer compound is included in the three-dimensional crosslinked structure. The inventive optical device using the inventive polymer gel composition is described in detail below with reference to the drawings.

Figure 1:
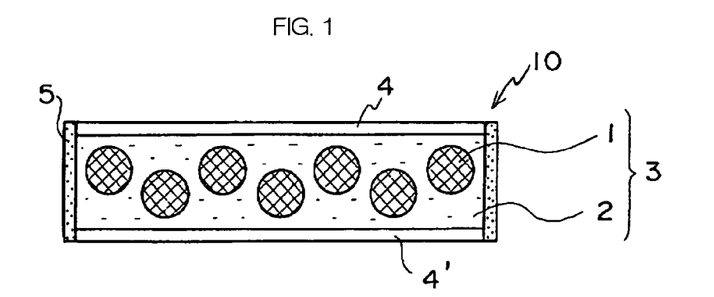
FIG. 1 is a schematic sectional view showing an example of an optical device according to the present invention.

FIG. 1 is a schematic sectional view showing an example of the inventive optical device. In an optical device 10, a polymer gel composition 3 comprising three-dimensional crosslinked structures 1 and a liquid 2 is placed between substrates 4 and 4' arranged in parallel. The ends of the substrates 4 and 4' are each sealed with a sealant 5. The liquid 2 contains a polymer compound compatible with it. Each three-dimensional crosslinked structure 1 and the polymer compound compatible with the liquid 2 interact with each other to form a polymer complex.

The thickness of the polymer gel composition 3 (namely the distance between the substrates 4 and 4') is not restricted but preferably in a range from 1 µm to 3 mm, more preferably in a range from 20 µm to 1000 µm. If the thickness is less than 1 µm, the relatively short optical path length in the thickness direction can cause a problem such as an insufficient optical density. If the thickness is more than 3 mm, the response of the three-dimensional crosslinked structure 1 can be poor in the polymer gel composition 3, or the three-dimensional crosslinked structures 1 are layered more than necessary in the thickness direction so that a sufficient transmittance cannot be provided. If the thickness is less than 1 µm in the case that a portion of the liquid-compatible polymer compound has a continuous crosslinked structure, the mechanical strength can disadvantageously be low.

According to the invention, the material for the optical device may be the polymer gel composition in which a portion of the liquid-compatible polymer compound has a crosslinked structure. In such a case, the polymer gel composition can be formed into a plate, a film or a sheet, when an optical device is prepared. A single particle of the three-dimensional crosslinked structure may also be used for an optical device.

Figure 2:
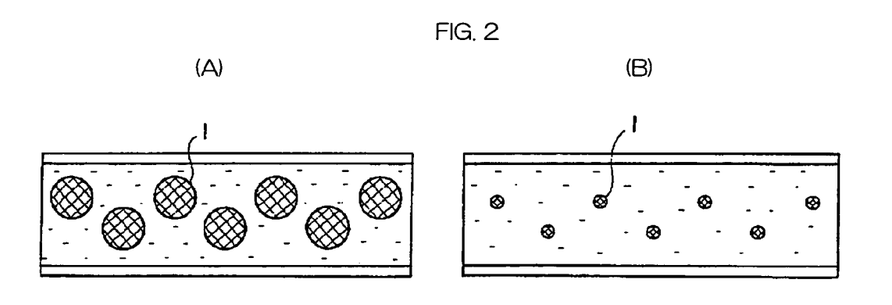
FIG. 2 is a diagram for showing the mechanism of Polymer gel composition 3.

The mechanism of the polymer gel composition 3 is described below with reference to FIG. 2. As described above, the polymer gel composition 3 can change its volume when the three-dimensional crosslinked structures 1 in the solution 2 absorb or release the liquid in response to an external stimulus to expand as shown in FIG. 2A or to shrink as shown in FIG. 2B. The light transmittance or the like resulting from scattering or diffraction varies with such a change in volume.

In the case that the three-dimensional crosslinked structures 1 each contain a light-modulating material at a concentration equal to or higher than the concentration for the saturated absorption or the saturated scattering, the light absorption efficiency varies depending on a change in volume of the three-dimensional crosslinked structures 1 so that the optical density varies. Specifically, the optical density becomes high when the three-dimensional crosslinked structures 1 expand (FIG. 2A) and becomes low when they shrink (FIG. 2B).

The inventive polymer gel composition having the optical characteristics as described above is used as a material for an optical device such as a light-modulating device and a display device.

The substrate 4 or 4' may be made of the material as described below. The substrate 4 or 4' may be a transparent substrate such as a glass. Flexible film substrates can form a flexible optical device. Any other component layer such as a protective layer and a layer for preventing vaporization of the absorbed/released liquid may also be formed on the substrate 4 or 4'.

The substrate 4 or 4' may be a film or a plate of a polymer such as polyester, polyimide, poly(methyl methacrylate), polystyrene, polypropylene, polyethylene, poly(ethylene terephthalate) (PET), polyamide, poly(vinyl chloride), poly(vinyliden chloride), polycarbonate, polyethersulfone, a cellulose derivative, a silicone resin, an epoxy resin, and a polyacetal resin; or an inorganic substrate such as a glass substrate, a metal substrate and a ceramic substrate.

At least one of the substrates 4 and 4' should be optically transparent. In a case where the optical device 10 is a transmission type, both substrates 4 and 4' are preferably transparent. The substrate 4 or 4' may have any thickness and any size. The thickness or the size may vary with the size of a display device using the optical device 10. For example, the thickness is preferably in a range from 10 μm to 20 mm.

The inventive polymer gel composition may be formed into a film. In such a case, a film substrate may be used, such as a film of polyester, polyimide, poly(methyl methacrylate), polystyrene, polypropylene, polyethylene, polyamide, poly(vinyl chloride), poly(vinyliden chloride), polycarbonate, polyethersulfone, a cellulose derivative, a fluororesin, a silicone resin, an epoxy resin, or a polyacetal resin; and a metal film. When the film-shaped polymer gel composition is used, the thickness of the substrate 4 is preferably selected from a range from 10 μm to 10 mm, and the thickness of the polymer gel composition is preferably selected from a range from 5 μm to 10 mm, for the optical device 10 as shown in FIG. 1.

Figure 3:
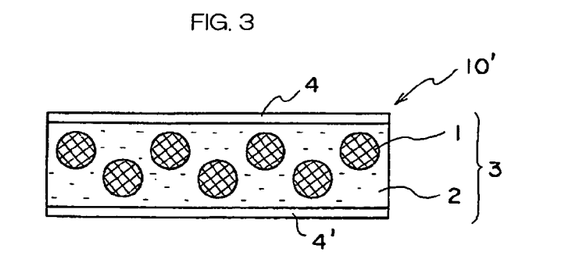
FIG. 3 is a schematic sectional view showing another example of the optical device according to the invention.

The sealant 5 is preferably provided as an optional element, and as shown in FIG. 3, an optical device 10' without such a sealant may also be provided.

The sealant 5 may comprise any material that is capable of suppressing evaporation of the liquid 2, adhesive to the substrates 4 and 4', harmless to the characteristics of the light modulation composition, and capable of maintaining the above conditions for a long time under practical use conditions. Different sealants may also be used in combination.

In a sealing process, the sealant is preferably formed into a single layer in terms of keeping an adequate aperture area of the optical device and simplifying the process for cost. For example, a single layer of the sealant may be formed using a thermosetting elastic sealant mainly composed of an isobutylene oligomer having a reactive group at its end. A two-layer seal may also be provided, for example, which comprises a primary seal of a polyisobutylene sealant or the like and a secondary seal of an acrylic resin or the like. Any other material may also be used, such as an inorganic material such as glass and ceramics, polyesters such as poly(ethylene terephthalate), poly(ethylene isophthalate), polyethylene-2,6-naphthalate, poly(butylene terephthalate), and copolymers thereof, polycarbonate, polyethersulfone, polysulfone, polyimide, and polyarylate. Any method of sealing may be selected from a wide variety of methods, and any combination thereof may also be used. The sealant 5 preferably has good gas barrier properties.

The optical device of the invention can serves as a light modulator or a display using natural energy such as a change in atmospheric temperature and a change in amount of sunlight. The optical device may also have stimulus application means in order to actively modulate light. In such a case, the stimulus application means externally stimulates the polymer complex in a similar manner as described above. Examples of such means include an electric heat resistor as well as a variety of any other heat application means such as light application means, electromagnetic wave application means and magnetic field application means. In particular, the electric heat resistor is preferably used. Specifically, a heat resistor layer is preferably used, such as a metal layer such as a Ni—Cr alloy layer, a tantalum boride layer, a tantalum nitride layer, a layer of an oxide such as tantalum oxide and ITO, and a carbon layer. Such a layer may be wired, and current may be applied to the layer to generate heat. For an active modulation of light, on the other hand, light may be applied using a layered light-emitting device such as a laser, LED, and EL, or a magnetic field or an electromagnetic wave may be applied by a magnetic coil, electrodes, or the like.

In a preferable mode, the heat-stimulus application means is patterned or segmented so as to modulate the light at any desired site. The polymer gel composition containing dispersed polymer gels with specific characteristics is preferably arranged corresponding to such a pattern.

The optical device of the invention is not limited to the structure as shown in FIG. 1 or 3. It may have any component other than the polymer gel composition 3 or the substrate 4 or 4', shown in FIG. 1 or 3. For example, an optional component may be provided, such as a protective layer for protecting the optical device, an anti-staining layer, an anti-reflection layer, a UV-absorbing layer, an antistatic layer, and a layer for preventing vaporization of the inner liquid.

While preferable embodiments of the invention have been shown and described above, it will be apparent that various changes and modifications may be made therein within the gist of the invention.

EXAMPLES

The present invention is described in more detail in the examples below, which are not intended to limit the scope of the invention.

Examples 1 to 13

Synthesis of Three-Dimensional Crosslinked Structure A

A three-dimensional crosslinked structure A is produced by the process below.

Mixed are 90.0 g of acrylamide, 0.36 g of methylenebisacrylamide as a crosslinking agent and 366 g of distilled water and stirred until the acrylamide and the crosslinking agent are completely dissolved in the water. The resulting mixture is named aqueous solution B. Nitrogen is introduced into the aqueous solution B for 30 minutes for removal of oxygen, and then a solution of 0.48 g of ammonium persulfate (a polymerization initiator) in 5.0 ml of water is added thereto.

A solution of 130.0 g of a sorbitol surfactant (trade name: SO-15R, manufactured by Nikko Chemicals Co., Ltd.) in 2.4 L of cyclohexane is added to a nitrogen-filled reaction vessel, and the resulting aqueous solution B is added thereto. The mixture is stirred with a rotary agitator at 1200 rpm for 20 minutes to form a suspension. To the suspension is added 7.0 ml of tetramethylethylenediamine, and the mixture is stirred at 300 rpm at 15° C. for 3 hours while polymerization is performed. After the polymerization is completed, the cyclohexane is almost removed by decantation, and 1 L of dimethylformamide is added thereto, before washing is performed. The dimethylformamide is then removed by decantation, and the product is washed with a large amount of distilled water for purification, so that particles of a three-dimensional crosslinked structure (named three-dimensional crosslinked structure A) (an acrylamide gel) are obtained.

Synthesis of Three-Dimensional Crosslinked Structure C Containing Light-Modulating Material A three-dimensional crosslinked structure C containing a light-modulating material is produced by the process below.

Mixed are 90.0 g of acrylamide, 0.36 g of methylenebisacrylamide as a crosslinking agent, 144.0 g of an aqueous dispersion of a carbon black pigment (trade name: TBK-BC3, manufactured by Taisei Kako Co., Ltd., with a pigment content of 15.1% by mass), and 231 g of distilled water and stirred until the acrylamide and the crosslinking agent are completely dissolved in a carbon black dispersion. The resulting mixture is named aqueous solution D. Nitrogen is introduced into the aqueous solution D for 20 minutes for removal of oxygen, and then a solution of 1.6 g of ammonium persulfate (a polymerization initiator) in 5 ml of water is added thereto.

A solution of 130.0 g of a sorbitol surfactant (trade name: SO-15R, manufactured by Nikko Chemicals Co., Ltd.) in 2.4 L of cyclohexane is added to a nitrogen-filled reaction vessel, and the resulting aqueous solution D is added thereto. The mixture is stirred with a rotary agitator at 1200 rpm for 20 minutes to form a suspension. To the suspension is added 7.0 ml of tetramethylethylenediamine, and the mixture is stirred at 300 rpm at 15° C. for 3 hours while polymerization is performed. After the polymerization is completed, the cyclohexane is almost removed by decantation, and 1 L of dimethylformamide is added thereto, before washing is performed. The dimethylformamide is then removed by decantation, and the product is washed with a large amount of distilled water for purification, so that spherical particles of a three-dimensional crosslinked structure (named three-dimensional crosslinked structure C) (an acrylamide gel) are obtained.

Synthesis of Three-Dimensional Crosslinked Structure E Containing Ionic Component A three-dimensional crosslinked structure E containing an ionic component and a light-modulating material is produced by the process below.

In 4.32 g of distilled water are dissolved 3.0 g of acrylamide, 12.0 mg of methylenebisacrylamide as a crosslinking agent, 88.2 mg of 2-acrylamide-2-methylpropane sulfonic acid as an ionic component, and 0.37 ml of an aqueous 1.25 M sodium hydroxide solution. Into the solution is mixed 8.5 g of an aqueous dispersion of a carbon black pigment (trade name: TBK-BC3, manufactured by Taisei Kako Co., Ltd., with a pigment content of 15.1% by mass) and stirred. The resulting mixture is named aqueous solution F. Nitrogen is introduced into the aqueous solution F for 20 minutes for removal of oxygen, and then a solution of 0.106 g of ammonium persulfate (a polymerization initiator) in 0.5 ml of water is added thereto.

A solution of 9.0 g of a sorbitol surfactant (trade name: SO-15R, manufactured by Nikko Chemicals Co., Ltd.) in 300 ml of cyclohexane is added to a nitrogen-filled reaction vessel, and the resulting aqueous solution F is added thereto. The mixture is stirred with a rotary agitator at 1200 rpm for 20 minutes to form a suspension. To the suspension is added 0.5 ml of tetramethylethylenediamine, and the mixture is stirred at 300 rpm at 15° C. for 3 hours while polymerization is performed. After the polymerization is completed, the cyclohexane is almost removed by decantation, and 1 L of dimethylformamide is added thereto, before washing is performed. The dimethylformamide is then removed by decantation, and the product is washed with a large amount of distilled water for purification, so that spherical particles of a three-dimensional crosslinked structure (named three-dimensional crosslinked structure E) (an acrylamide gel) are obtained, which has an average particle diameter of about 50 µm in a swollen state and contains the light-modulating material.

Comparative Example 1

Production of Polymer Gel Composition Having IPN Structure 1

Mixed are 90.0 g of acrylamide, 0.36 g of methylenebisacrylamide as a crosslinking agent and 366 g of distilled water and stirred until the acrylamide and the crosslinking agent are completely dissolved in the water. Nitrogen is introduced into the resulting solution for 30 minutes for removal of oxygen, and then a solution of 0.48 g of ammonium persulfate (a polymerization initiator) in 5.0 ml of water is added thereto to start polymerization. After a 3-hour polymerization time period, the whole of the reaction product is cured to form an acrylamide gel. After washed with a large amount of water, the gel is cut into 2 cm square pieces and then vacuum-dried.

A process as shown below is then carried out, which includes preparing an IPN-structured gel containing a second component, acrylic acid, and crushing the gel into particles of an IPN-structured polymer gel composition. The dried acrylamide gel pieces are placed in an aqueous solution of 360 g of acrylic acid and 1.8 g of a crosslinking agent N,N'-methylenebisacrylamide (3.6 L in total volume) so that the acrylic acid, the second component, is allowed to penetrate into the gel pieces. After allowed to stand at room temperature for 2 days, the solution is mixed with 1.8 g of ammonium persulfate as a polymerization initiator, and polymerization is carried out at 60° C. for 6 hours. The resulting polymer gel, which is expected to have an IPN structure formed by polymerization, is crushed and subjected to an examination for change in volume. As a result, it is found that a portion of the gel changes its volume and that the major part of the gel shows no change in volume and is uneven in characteristics.

Comparative Example 2

Production of Polymer Gel Composition Having IPN Structure 2

In a two-neck round bottomed flask, 10 g of an aqueous dispersion of particles of the three-dimensional crosslinked structure C (with a solids concentration of about 3% by mass) is mixed with 0.3 g of acrylic acid, 0.02 g of methylenebisacrylamide as a crosslinking agent and 2.0 g of distilled water. After the air is replaced with nitrogen, the mixture is allowed to stand at room temperature for 1 hour.

A solution of 0.009 g of ammonium persulfate in 0.5 g of water is then added thereto to form a liquid mixture. The liquid mixture is heated at 70° C. and polymerized for 6 hours. As a result, the acrylic acid is polymerized, and the whole of the solution forms a bulky gel. No particles having an IPN structure formed of the acrylic acid and the particles of three-dimensional crosslinked structure C are yielded.

Preparation of Polymer Gel Composition and Function Evaluation

A polymer gel composition is prepared by adding 1.0 g of an aqueous dispersion of the resulting particles of the three-dimensional crosslinked structure A, C or E (with a solids concentration of about 3% by mass) to 3.0 g of a poly(acrylic acid) solution. The composition of each prepared polymer gel composition is shown in Table 1. Based on the amount of the acrylic acid residue of the poly(acrylic acid), 3% of sodium hydroxide is added to each solution in order to adjust the pH.

TABLE 1

|  | Three-Dimensional Crosslinked Structure | Poly(acrylic acid) Solution | | | Amount of Volume Change |
|---|---|---|---|---|---|
|  |  | Concentration | Weight Average Molecular Weight | Solvent Composition |  |
| Example 1 | A | 2% by mass | 25,000 | $H_2O$ | 3.5 |
| Example 2 | A | 5% by mass | 25,000 | $H_2O$ | 3.2 |
| Example 3 | A | 7.5% by mass | 25,000 | $H_2O$ | 3 |
| Example 4 | A | 10% by mass | 25,000 | $H_2O$ | 3 |
| Example 5 | C | 2% by mass | 25,000 | $H_2O$ | 10.2 |
| Example 6 | C | 5% by mass | 25,000 | $H_2O$ | 7.8 |
| Example 7 | C | 7.5% by mass | 25,000 | $H_2O$ | 6.5 |
| Example 8 | C | 10% by mass | 25,000 | $H_2O$ | 6.7 |
| Example 9 | E | 5% by mass | 25,000 | $H_2O$ | 4.2 |
| Example 10 | E | 5% by mass | 25,000 | $H_2O/MeOH = 8:2$ | 10.3 |
| Example 11 | C | 5% by mass | 800,000 | $H_2O$ | 6 |
| Example 12 | C | 5% by mass | 5,000 | $H_2O$ | 7 |
| Example 13 | C | 5% by mass | 2,000 | $H_2O$ | 5.5 |
| Comparative Example 1 | A | — | — | $H_2O$ | 1.1 |
| Comparative Example 2 | C | — | — | $H_2O$ | 1.1 |

Each polymer gel composition is placed on a one-well slide glass and held on a hot plate. While the temperature is changed, the volume-changing behavior of each composition is observed using an optical microscope. The observation is made 1 hour after the preparation of each polymer gel composition. In the microscope observation, the diameter of the three-dimensional crosslinked structure is measured, and its volume is calculated. The amount of volume change is defined by the following formula:

Amount of volume change=(volume at 60° C.)/(volume at 10C.)     (Formula 1)

The results of the measurement are shown in Table 1.

It is apparent from the results that the three-dimensional crosslinked structure significantly changes its volume when the polymer compound capable of forming a polymer complex with the three-dimensional crosslinked structure is added to the solution. The three-dimensional crosslinked structure, which constitutes the polymer gel composition of the invention, can change its volume in response to the external stimuli.

Example 14

An optical device is prepared using the polymer gel composition of the invention by the process below.

An aqueous poly(acrylic acid) solution (named solution G) is prepared by mixing 1.0 g of an aqueous solution of 20% by mass poly(acrylic acid) (with a weight average molecular weight of 25,000), 4.8 g of an aqueous solution of 6.2% by mass poly(acrylic acid) (with a weight average molecular weight of 1,250,000), 0.166 ml of 1.25 mol/L sodium hydroxide, 2.0 g of distilled water, and 2.0 g of methanol.

To 2.0 g of the solution G is added 2.0 g of a dispersion of the three-dimensional crosslinked structure E (with a solids concentration of about 3.0%), and the mixture is subjected to a dispersion process for 3 minutes in a planetary dispersing mixer (trade name: KK-100, manufactured by Kurabo Industries Ltd.), so that the particles of the three-dimensional crosslinked structure are uniformly dispersed in the solution. The resulting dispersion is sandwiched between two glass substrates (50×50×0.9 mm) through polystyrene spacer beads 100 μm in particle diameter. The end faces of the substrates are coated with a UV curable resin (trade name: KAYARAD R381-I, manufactured by Nippon Kayaku Co., Ltd.) and sealed by ultraviolet irradiation (with a high-pressure mercury-vapor lamp, at 120 W/cm, with an irradiation distance of 20 cm, for a irradiation time of 30 seconds) so that an optical device (named optical device 1) is obtained.

Example 15

Mixed are 20 g of an aqueous solution of 20% by mass poly(acrylic acid) (with a weight average molecular weight of 250,000) and 0.5 g of glycidyl methacrylate and stirred at room temperature for 24 hours so that they are allowed to react with each other to form poly(acrylic acid) having a crosslinkable methacrylate group. The resulting solution is mixed with 0.8 g of a photoinitiator (trade name: IRGA- CURE 2959, manufactured by Ciba Specialty Chemicals Inc.), 80 g of pure water and 3 g of poly(acrylic acid) (with a weight average molecular weight of 25,000) to form an aqueous poly(acrylic acid) solution (named solution H). To 2.0 g of the solution H is added 2.0 g of a dispersion of the three-dimensional crosslinked structure E (with a solids concentration of about 3.0%), and the mixture is subjected to a dispersion process for 3 minutes in a planetary dispersing mixer (trade name: KK-100, manufactured by Kurabo Industries Ltd.), so that the particles of the three-dimensional crosslinked structure are uniformly dispersed in the solution. The resulting dispersion is sandwiched between two glass substrates (50×50×0.9 mm) through polystyrene spacer beads 100 μm in particle diameter and irradiated with ultraviolet rays (with a high-pressure mercury-vapor lamp, at 160 W/cm, for 150 sec, with an irradiation distance of 40 cm), so that the poly(acrylic acid) solution part is gelated to form a cured product with self supporting properties. The end faces of the substrates are coated with a UV curable resin (trade name: KAYALRAD R38 1-I, manufactured by Nippon Kayaku Co., Ltd.) and sealed by ultraviolet irradiation (with a high-pressure mercury-vapor lamp, at 120 W/cm, with an irradiation distance of 20 cm, for a irradiation time of 30 seconds) so that an optical device (named optical device 2) is obtained.

Function Evaluation

Each prepared optical device is measured for its transmittance varying with temperature, a range of transmittance variation, and an amount of change in volume of the three-dimensional crosslinked structure from a shrunken state (at 10° C.) to an expanded state (at 60° C.) The particle of the three-dimensional crosslinked structure is observed with a microscope, when it changes its volume from a shrunken state to an expanded state in response to the stimuli, and the amount of such a change is determined as the amount of change in volume of the three-dimensional crosslinked structure. NDH2000 manufactured by Nippon Denshoku Industries Co., Ltd. is used to measure a total luminous transmittance.

TABLE 2

| | Amount of Volume Change | Total Luminous Transmittance | | Range of Transmittance Variation |
|---|---|---|---|---|
| | | Fading | Coloring | |
| Example 14 | 9.8 | 72% | 14% | 58% |
| Example 15 | 7.5 | 70% | 25% | 45% |

It is demonstrated that the optical device of Example 14 or 15 significantly changes its total luminous transmittance by 40% or more in response to a change in temperature.

The polymer gel composition of the invention can conveniently be produced without the conventional IPN formation process. According to the conventional technique, the initial characteristics can be changed. For example, a sol component synthesized at the time of the preparation of the IPN gel can gradually flow out of the IPN gel so that the IPN gel can change its composition, or one occurrence of swelling can reduce the interlacement of the polymers so that the gel can be resistant to shrinkage. In contrast, the polymer gel composition of the invention can show stable characteristics over a long time period, because the inventive composition contains the liquid-compatible polymer capable of constantly forming the polymer complex in the three-dimensional crosslinked structure.

The optical device of the invention, which uses the polymer gel composition of the invention, can show stable optical characteristics over a long time period.

What is claimed is:

1. A polymer gel composition, comprising:
   at least two polymer compounds which interact with each other to form a polymer complex, and
   a liquid;
   wherein:
   only one of the polymer compounds forms a three-dimensional crosslinked structure, wherein the three-dimensional crosslinked structure is in a particle shape, and wherein the particles of the three-dimensional cross-linked structure are dispersed in the liquid;
   at least one other polymer compound is soluble in the liquid; and
   at least a portion of the soluble polymer compound is included in the three-dimensional crosslinked structure.

2. The polymer gel composition according to claim 1, wherein the polymer complex is reversibly disassembled by a stimulus so that the polymer compound forming the three-dimensional crosslinked structure exhibits a change in volume by absorbing or releasing the liquid.

3. The polymer gel composition according to claim 2, wherein the stimulus is heat.

4. The polymer gel composition according to claim 1, wherein the polymer complex has a phase transition temperature of −50° C. to 80° C.

5. The polymer gel composition according to claim 1, wherein at least one of the polymer compounds forming the polymer complex includes a carboxylic amide group, and at least one other polymer compounds includes a carboxyl group.

6. The polymer gel composition according to claim 1, wherein the polymer compound forming the three-dimensional crosslinked structure has at least one ionic substituent.

7. The polymer gel composition according to claim 1, wherein the polymer compound forming the three-dimensional crosslinked structure includes a light-modulating material.

8. An optical device, comprising a polymer gel composition, the polymer gel comprising:
   at least two polymer compounds which interact with each other to form a polymer complex; and
   a liquid;
   wherein:
   only one of the polymer compounds forms a three-dimensional crosslinked structure;
   at least one other polymer compound is soluble in the liquid; and
   at least a portion of the soluble polymer compound is included in the three-dimensional crosslinked structure.

9. An optical device, comprising: a pair of substrates; and a polymer gel composition disposed between the pair of substrates, ends to the substrates being sealed, wherein
   the polymer gel composition comprises: at least two polymer compounds which interact with each other to form a polymer complex; and a liquid, and only one of the polymer compounds forms a three-dimensional crosslinked structure;
   at least one other polymer compound is soluble in the liquid; and
   at least a portion of the soluble polymer compound is included in the three-dimensional crosslinked structure.

* * * * *